United States Patent [19]

Peacock et al.

[11] Patent Number: 4,987,769
[45] Date of Patent: Jan. 29, 1991

[54] ULTRASONIC LEAK DETECTION

[75] Inventors: David J. H. Peacock, 200-204 Bye Pass Road, Chillwell, Nottingham, United Kingdom, NG9; Michael D. Dorsett, Nottingham, United Kingdom

[73] Assignee: David John Howard Peacock, Chillwell, United Kingdom

[21] Appl. No.: 431,832

[22] Filed: Nov. 6, 1989

[51] Int. Cl.⁵ .............................................. G01M 3/24
[52] U.S. Cl. ...................................... 73/49.7; 73/592; 73/40.5 A
[58] Field of Search .................... 73/49.7, 40.5 A, 592

[56] References Cited

U.S. PATENT DOCUMENTS 3,055,209  9/1962  Reid et al. ............................. 73/592
4,287,581  9/1981  Neale, Sr. ..................... 73/40.5 A X
4,719,801  1/1988  Blaser et al. ........................... 73/592
4,901,576  2/1990  Rademacher ......................... 73/592

FOREIGN PATENT DOCUMENTS 0060469  9/1982  European Pat. Off. .
2089982  6/1982  United Kingdom .

Primary Examiner—Hezron E. Williams
Assistant Examiner—Joseph W. Roskos
Attorney, Agent, or Firm—Shlesinger & Myers

[57] ABSTRACT

To permit ultrasonic leak detection, especially in internal combustion engines, an ultrasonic source is housed in a tubular body adapted for attachment to a sparking plug aperture in an engine and ultrasonic signals may thereby be injected into engine cylinders, there being an ultrasonic detector having a body with a tapered end to ensure directional limitation is used.

14 Claims, 3 Drawing Sheets

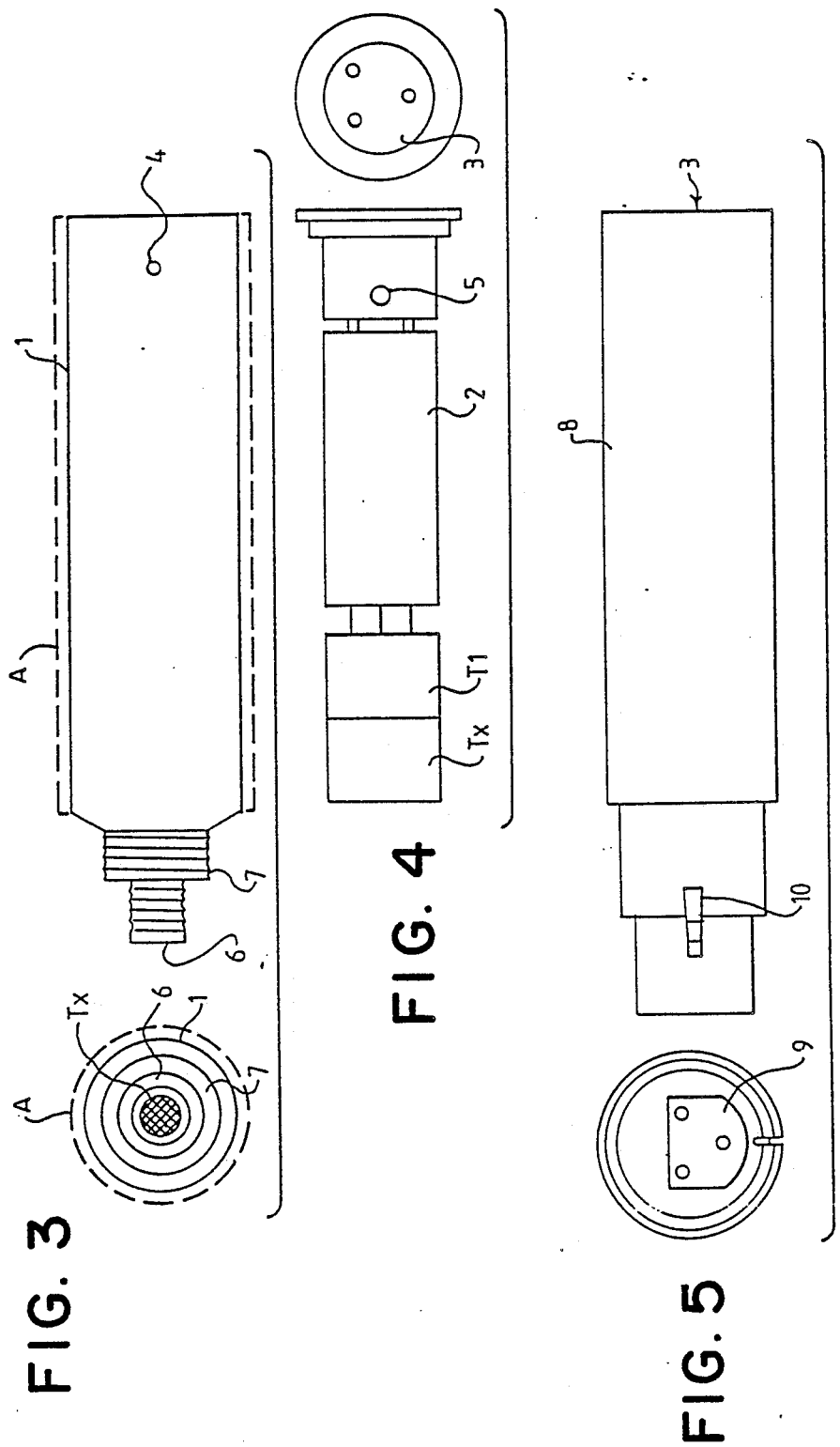

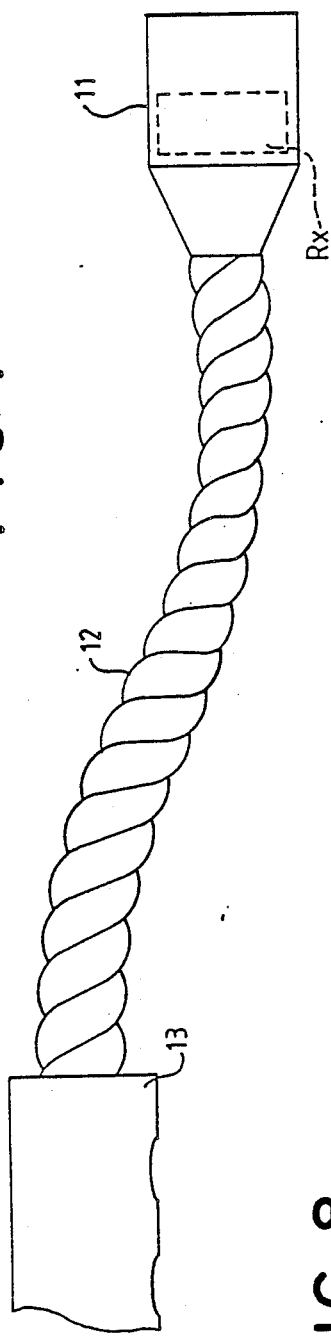
FIG. 7
FIG. 8
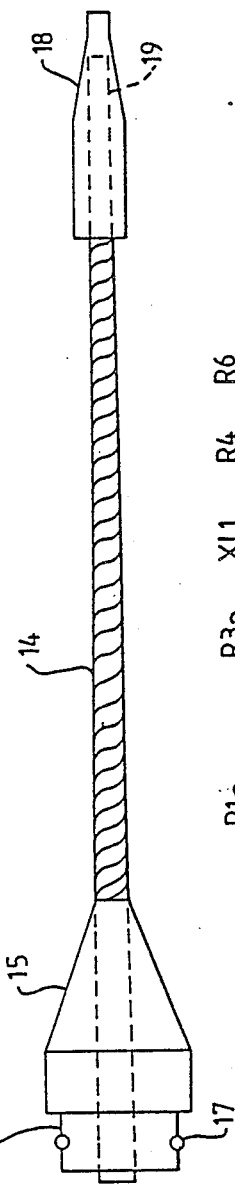
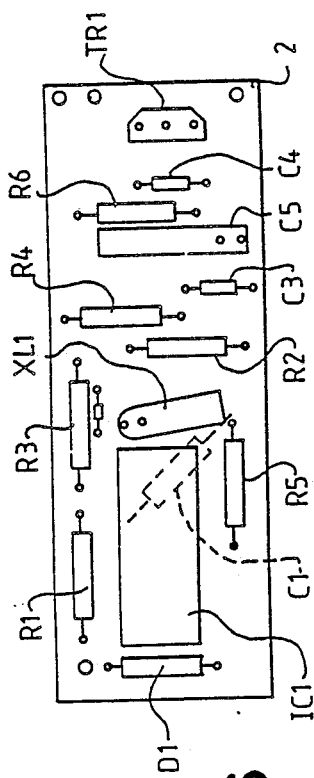
FIG. 6

ULTRASONIC LEAK DETECTION

BACKGROUND TO THE INVENTION

The present invention relates to ultrasonic leak detection and more particularly, but not exclusively to a method of testing an internal combustion engine and apparatus therefor.

It is known to use ultrasonic waves which pass freely through air gaps to show where such a gap occurs. For example in pressurised or evacuated pipe systems, ultrasonic tests may be carried out at flange joints to detect a leaking gasket and at other points in the system to locate hair-line fractures for example. If pipe pressure or vacuum is sufficiently high then a leak may create its own ultrasonic or sonic waves and an ultrasonic detector may be used to locate the fault.

In an alternative method, ultrasonic generators may be used to inject ultrasonic signals into the system particularly where the internal pressure or vacuum is not sufficient in itself to cause a leak to go ultrasonic. Escaping ultrasonic signals may be detected as before to enable determination of necessary remedial action.

The physical size of presently available ultrasonic signal generators inhibits their use in many applications. Furthermore, where multiple leakage paths may occur, it may be difficult to determine where a leak is occurring. Considering a specific example with regard to an internal combustion engine, if say two adjacent cylinders of the engine have a leakage path between them then the leak may be by way of a head gasket fault, through an inlet valve or through an exhanust valve for example.

It will also be noted that an engine is not a stable system—that is to say that gas pressures are constantly varying in differing parts thereof. Thus unstable readings are obtained in dependance upon the relative position in the cycle of the engine. Leak detection without running the engine is accordingly extremely difficult whilst with the engine running, exhaust leaks, ignition systems, fuel injectors and general background ultrasonic signals (for example from bearings) all interfere with ultrasonic leak detection.

SUMMARY OF THE INVENTION

According to a first aspect of the present invention there is provided ultrasonic leak detection apparatus comprising an ultrasonic source housed in a body adapted for attachment to a container of the kind which includes at least one sealable aperture, the body including means for maintaining integrity of the container, the apparatus further comprising an ultrasonic detector mounted in a portable body which is adapted to direct ultrasonic signals from a visually identifiable location to the ultrasonic detector whereby by injecting ultrasonic signals from the source into a container, location of any breach of integrity of such container may be carried out without dismantling thereof.

In a specific detector for use with an internal combustion engine, the body which houses the source comprises a threaded connector for insertion in an aperture of the engine in place of a sparking plug for example.

A plurality of threaded connectors may be provided to cater for differing sizes of aperture, the connectors being arranged in stepped relationship with the smallest connector at one extremity of the source body.

The source body is preferably tubular and incorporates electronic circuitry for generating and controlling ultrasonic signals, the circuit being connected to a power source by way of a demountable electrical connection included at the opposed extremity to the threaded connectors.

An ultrasonic absorber such as a foamed rubber tube may be provided for placement around the source body to reduce ultrasonic emmissions therefrom.

One or more extension parts may be provided, each extension comprising an elongate body having an identical demountable connector at one end and a matching socket at the opposed end to facilitate extending the reach of the apparatus.

The detector body is preferably a tube comprised of coiled metal sections to provide a flexible arrangement which may be twisted or curved around obstacles attached to the engine, the detector being permanently mounted at a fixed position within the body and being electrically connected to electronic circuitry housed in a portable box.

A second part of the body, demountably connectable to the first part of the body and similarly comprised of coiled metal sections may be provided, the second part of the body having a reduced section towards the end opposed to the detector whereby leakages may be more specifically located.

The second part of the body may include an inner tube of plastics material whereby ultrasonic signals are not deflected by the coiled metal sections.

According to a second aspect of the present invention there is provided a method of detecting leaks in an internal combustion engine comprising injecting an ultrasonic signal through an aperture in a cylinder of the engier and detecting ultrasonic leakage signals using a directional ultrasonic detector thereby detecting sources of leakage from the engine.

BRIEF DESCRIPTION OF THE DRAWINGS

Ultrasonic leak detection apparatus and methods of using it in accordance with the invention will now be described by way of example only with reference to the accompanying drawings of which:

FIG. 3 shows a side and end view of the source body and an alternative configuration shown in phantom lines;

FIG. 4 shows plan and end vies of the source and electronic circuit when removed from the body of FIG. 3;

FIG. 5 shows side and end views of an extension piece for connection to the body of FIG. 3;

FIG. 6 shows a component layout for the circuit of FIG. 2 arranged for fitting to the body of FIG. 3 as shown in FIG. 4;

FIG. 7 shows a first part of the body for housing the detector; and

FIG. 8 shows a second part of the body for housing the detector.

DESCRIPTION OF THE PREFERRED EMBODIMENT

Figure 1:
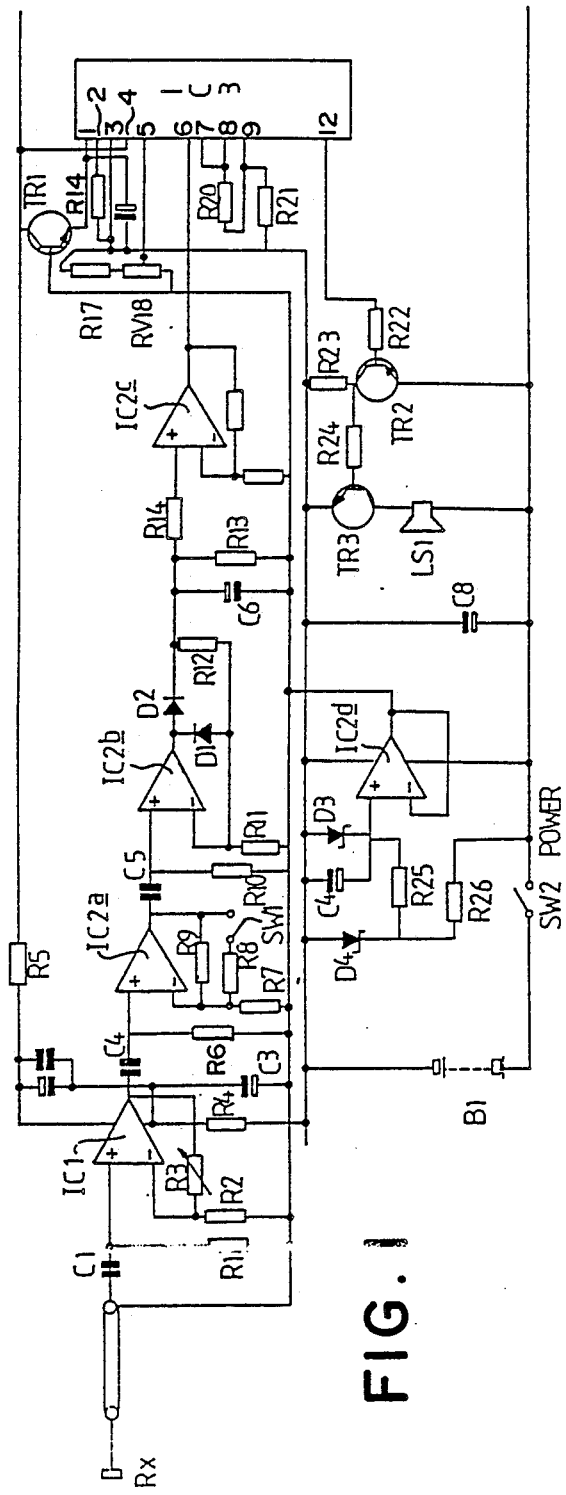
FIG. 1 is a circuit diagram of an electronic circuit for the detector unit.
Figure 2:
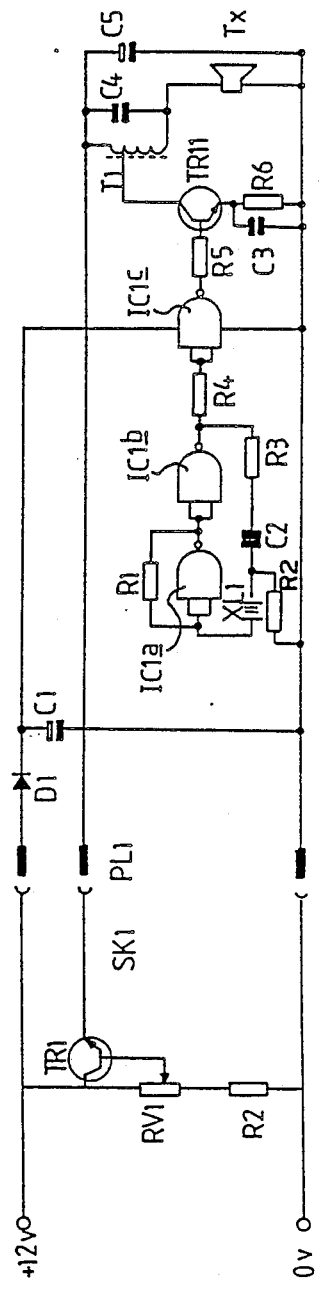
FIG. 2 is a circuit diagram of an electronic circuit for the source unit.

Referring first to FIGS. 1 and 2, the apparatus has three circuits comprising the ultrasonic source, the ultrasonic detector and the source power control.

The detector circuit together with the source power control are housed in a hand carriable unit (in practice a plastics box) the source circuit being connected to the box by way of a three pin plug and socket arrangement PLI,SKI The detector unit (FIG. 1) is arranged to detect low level ultrasonic signals and provide a display related to the amount of leakage.

An ultrasonic transducer RX of known kind converts acoustic signals into low level electrical signals the amplitude of which is proportional to the intensity of an ultrasonic leakage signal received. In this example, the selected transducer has a peak sensitivity of approximately forty kilohertz.

An integrated circuit amplifier IC1 amplifies the signal, the gain of amplification being set by a variable resistor R3 which may be varied during use by means of a control on the unit housing. A further amplification stage IC2a is preceded by an RC network comprising resistor R6 and capacitor C4 to reduce the effect of low frequency interference and noise and prevent their further amplification.

The amplifier IC2a has a switchable gain facility which may be switched in using switch SW1 where high levels of leakage signal are present, the resistor R8 reducing the gain of the amplifier IC2a by approximately 15 decibels. The effects of low frequency interference and noise are further reduced by an RC network comprising resistor R10 and capacitor C5 before the output is rectified by a positive peak detection circuit comprising a circuit IC2b and diodes D1,D2.

A capacitor C6 and resistors R13,R14 provide smoothing and controlled decay of the d.c. signal whilst the circuit IC2c acts to provide a buffer and d.c. amplification facility to interface the signal to an output display IC3 comprising a ten-stage light emitting diode driver of the kind having a logarithmic response.

The ten-stage display is mounted on the box housing the detector circuit and the source power control, the box also housing a nine volt d.c. power supply such as battery B1, any lower voltage required being derived from the battery by diodes D3,D4 and integrated circuit IC2d.

The transducer RX is mounted in a separate body (as hereinafter described) and is connected to the circuit by way of a flexible connector lead.

Finally, so that an operator may be aware of the detector circuit receiving excessive leakage signals for a selected range, a piezo-electric sounder LS1 is driven by a transistor circuit comprising transistors TR2,TR3 and resistors R22,R23 and R24 driven from an overflow output of the display driver IC3.

Referring now to FIG. 2, the source power control uses a transistor TR1 as a voltage follower controlled by a variable resistor RV1 which enables the output drive voltage to be varied. The range over which the source power may be varied is of the order of fifty decibels. As has been previously mentioned, the source power control is housed in the hand-held unit which includes the detector circuitry.

The remainder of the ultrasonic source circuit is housed in a separated body part (as hereinafter described) and comprises a conventional crystal controlled oscillator outputting to an ultrasonic transmitter TX.

An integrated circuit oscillator IC1a,b,c (for example a CMOS integrated circuit type 4011) is controlled by a crystal XL1 and outputs through a power transistor TR1 (for example a transistor type ZTX 450), a transformer T1 and capacitor C4 which form a power output stage for the transmitter TX. This output stage is effectively a resonant step-up transformer which provides a high level drive to the transducer TX.

Turning now to FIGS. 3 and 4, the source circuit and the transducer TX are housed in a cylindrical body 1 of stainless steel for example, with the source circuit mounted on a circuit board 2 intermediate a plug connector 3 for connection to the power supply of FIG. 2 and the transformer T1 and the transducer TX. The circuit and other parts are retained in the body 1 by means of a grub screw which passes through an aperture 4 in the body 1 to enter a threaded aperture 5 in the plug 3.

At the opposed end to the plug 3, the body has stepped portions 6,7 which are threaded for screwed attachment to for example spark plug apertures of differing sizes in internal combustion engines thereby allowing injection of ultrasonic signals into combustion chambers. The layout of the circuit to enable fitting of same within the body 1 will be readily appreciated by reference to FIG. 6.

Preferably, around body 1, but not at the end where the threaded connections are provided, an ultrasonic absorber A shown in phanton lines is provided to reduce ultrasonic emissions from the body 1.

FIG. 5 to which reference is now made shows an extension piece to facilitate attachment between the source and the housing of the power supply where the connection aperture is in an awkward position. The extension piece comprises a body having an identical plug connector 3 to that of the source body 1 at one end. At the opposed end, a matching socket a is provided, the two being interconnected by internal wiring.

A spring latch 10 is arranged to effect mechanical interconnection between the extension piece and the body 1. It will be realised that several extension pieces may be connected in series if necessary without affecting the efficiency of the ultrasonic leak detection system since the ultrasonic source is constantly located with respect to the body under test.

Reference is now made to FIGS. 7 and 8 which show the two parts making up the detector body. The first part of the body (FIG. 7) houses the transducer RX located in an end portion 11. Wiring connections extend through a flexible portion 12 of the body comprising coiled spring tube of the kind sometimes called swan-neck tubing and thence through a rubber or plastics handle 13 only part of which is shown, to the hand-held unit hereinbefore described.

The second part of the body (FIG. 8) again comprises swan-neck tubing to provide a flexible portion 14. The flexible portion 14 has a much smaller diameter than the portion 12 and includes a first tapered portion 15 having a connecting section 16 for insertion in the end 11 of the portion 12. An 'O' ring 17 is arranged to effect an airtight seal between the connectors 11 and 16.

At the opposed end of the body portion 14, a further tapered section 18 is provided so that a very small area (e.g. a diameter of about 2 mm) is available for detection of ultrasonic leakage signals. Leakage signals collected at the end of 18 pass through a plastics tube 19 which prevents distortion of the signals by the internal ridges of the coiled section 14 of the body, the tube 19 terminating adjacent the transducer RX.

Use of the detector in various situations will now be described in connection with various functions to be performed in regard to testing of an internal combustion engine.

First, consideration is given to testing for vacuum leaks in the engine. With the engine running, the ultrasonic detector without the tapered extensions (FIG. 8) is scanned around the engine at a distance of approximately twenty-five centimeters. Any appreciable leakage will be shown by high ultrasonic leakage signals and further diagnosis is not necessary save possibly to use the tapered extension to pinpoint the location of leakage more accurately.

If no appreciable signal is present, the indication is that no leaks are present in the inlet vacuum or exhaust systems. Medium to low signal strengths indicate that further diagnosis using the ultrasonic source are required since, as hereinbefore noted, other engine parts such as bearings, ignition systems and like parts may give rise to ultrasonic signals at this level.

Further diagnosis is carried out with the engine stationary and the source screwed into a cylinder in place of a sparking plug for example. The cyclic position of the engine is arranged such that the inlet valve of the cylinder under test is fully open, the detector being used to locate any ultrasonic signals escaping from the inlet system. Using this method, very small leaks in the inlet system may be located due to the inherent high sensitivity of the detector arrangement.

In testing for valve and head gasket leakage for example the signal source body is again fitted to a cylinder in place of (e.g.) a sparking plug. For inlet valve leakage, the cyclic position of the engine is arranged such that the inlet valve of the cylinder under test is closed. Inserting the detector down the carburettor or fuel inlet with the throttle butterfly open allows detection of any ultrasonic leakage. Presence of such leakage indicates that the inlet valve of the cylinder under test is leaky.

Exhaust valve leakage is determined by arranging for the cyclic position of the engine to be such that the exhaust valve of the cylinder under test (i.e. that to which the detector is fitted) to be closed. The detector is inserted through the sparking plug aperture of another cylinder, the exhaust valve of which is open, the presence of ultrasonic leakage signals indicating exhaust valve leakage in the cylinder under test.

The test just mentioned may indicate the possibility of head gasket leakage if the cylinder to which the source is fitted and the cylinder used for detection are adjacent. If, however, non-adjacent cylinders are used the indication tends to be towards exhaust valve leaks.

To differntiate between the two kinds of leakage, a time of flight device may be used since the distance between a head gasket leakage and that of exhaust leakage paths is considerable. If time of flight measurement is not possible, the engine will need to be cyclically respositioned so that non-adjacent cylinders are used or so that both the inlet and exhaust valves of the cylinder under test are closed. With both valves closed, leakage to an adjacent cylinder indicates a head gasket leak.

Use of the apparatus for valve timing checks is also possible. By fitting the source to (e.g.) "number 1" cylinder and inserting the detector in the carburettor or fuel injection inlet (again with the throttle butterfly open), rotating the engine slowly by hand will result in a very high ultrasonic leakage signal reading at the inlet valve opening position. Results obtained in this manner are extremely accurate where mechanical operation is used but where hydraulic tappets are used in the engine results given are typically 15 degrees later than true.

Detection of leaks in areas of engines which are not normally ultrasound emitting are also possible. As an example, leakages above the throttle plate of an internal combustion engine are not normally detectable with the engine running since the vacuum levels are not sufficient to make such leaks ultrasonic. By fitting the source to a cylinder with the engine cyclically positioned to cause the inlet valve to be fully open and opening the throttle butterfly to its fullest extent such leakages may be detected.

As an alternative to the above test, in engines where sufficient space is present, the source may be directed into the air inlet system above the throttle plate.

The apparatus may also be used to test for leakage in other enclosures due to its small size. Any pipe having a dimension of, say, twenty mm or over permits insertion of the source into for example a vehicle fuel tank. Scanning outside the tank for ultrasonic leakage signals identifies the location of leaks.

Use of the device may be enhanced by means of a time of flight detector which enables the route taken by a leakage signal to be identified. This enhancement is particularly useful in cases where multiple leakage paths are possible such as indicated above with respect to head gasket and exhaust valve leakages. The time of flight adaptation may also be used to exclude unwanted signals - for example ultrasonic leakage from the body of the detector itself.

If time of flight measurement is not convenient and leakage from the ultrasonic source body is perceived as a problem, then this leakage may be reduced by placing a tube of foamed rubber for example over the source body thus enhancing the directional properties of the device.

We claim:

1. An ultrasonic leak detection apparatus, comprising:
   (a) a source body;
   (b) an ultrasonic source housed in said source body;
   (c) said source body being adapted for attachment to a container of a kind which includes at least one sealable aperture;
   (d) said source body including means for maintaining integrity of said container;
   (e) a portable detector body;
   (f) an ultrasonic detector mounted in said detector body;
   (g) means for adapting said detector body for directing ultrasonic signals from a visually identifiable location to said ultrasonic detector, whereby location of any breach of integrity of said container may be carried out by injecting ultrasonic signals from said source to said container; and
   (h) at least one extension part for connecting to said source body, said part comprising an elongate body having a demountable connector at one end and a matching socket at the opposed end to facilitate extending the reach of said apparatus.

2. An ultrasonic leak detection apparatus as in claim 1, wherein:
   (a) said detector body comprises a tube having coiled metal sections adapted for bending around obstacles; and
   (b) said detector is mounted in a fixed position within said body and electrically connected to an electronic circuitry housed in a portable unit.

3. An ultrasonic leak detection apparatus as in claim 2, wherein:

(a) said detector body comprises first and second parts;
(b) said second part is demountably connected to said first part;
(c) said first and second parts include coiled metal sections; and
(d) said second part includes a reduced section towards an end opposed to said detector whereby leakages may be more specifically located.

4. An ultrasonic leak detection apparatus as in claim 3, wherein:
(a) said second part includes an inner tube of plastic material, whereby ultrasonic signals are not deflected by said coiled metal sections.

5. An ultrasonic leak detection apparatus, comprising:
(a) a source body;
(b) an ultrasonic source housed in said source body;
(c) said source body being adapted for attachment to a cylinder of an internal combustion engine;
(d) said source body including means for maintaining integrity of said cylinder;
(e) a portable detector body;
(f) an ultrasonic detector mounted in said detector body;
(g) means for adapting said detector body for directing ultrasonic signals from a visually identifiable location to said ultrasonic detector, whereby location of any breach of integrity of said cylinder may be carried out by injecting ultrasonic signals from said source into said cylinder.

6. An ultrasonic leak detection apparatus as in claim 5, wherein:
(a) said source body comprises a threaded connector for insertion in an aperture of said cylinder.

7. An ultrasonic leak detection apparatus as in claim 6, wherein:
(a) said source body is generally tubular;
(b) said ultrasonic source includes electronic circuitry for generating and controlling ultrasonic signals; and
(c) a demountable electrical connection disposed at the opposed extremity to said threaded connector for connecting said circuitry to a power source.

8. An ultrasonic leak detection apparatus as in claim 6, and further comprising:
(a) an ultrasonic absorber disposed around said source body for reducing ultrasonic emissions therefrom.

9. An ultrasonic leak detection apparatus as in claim 5, wherein:
(a) said source body includes a plurality of threaded connectors for insertion in different sizes of apertures of a cylinder; and
(b) said connectors are arranged in stepped relationship with the smallest connector at one extremity of said source body.

10. An ultrasonic leak detection apparatus as in claim 5, and further comprising:
(a) at least one extension part for connecting to said source body, said part comprising an elongate body having a demountable connector at one end and a matching socket at the opposed end to facilitate extending the reach of said apparatus.

11. An ultrasonic leak detection apparatus as in claim 10, wherein:
(a) said detector body comprises a tube having coiled metal sections adapted for bending around obstacles; and
(b) said detector is mounted in a fixed position within said body and electrically connected to an electronic circuitry housed in a portable unit.

12. An ultrasonic leak detection apparatus as in claim 11, wherein:
(a) said detector body comprises first and second parts;
(b) said second part is demountably connected to said first part;
(c) said first and second parts include coiled metal sections; and
(d) said second part includes a reduced section towards an end opposed to said detector whereby leakages may be more specifically located.

13. An ultrasonic leak detection apparatus as in claim 12, wherein:
(a) said second part includes an inner tube of plastic material, whereby ultrasonic signals are not deflected by said coiled metal sections.

14. A method for detecting leaks in an internal combustion engine, comprising the steps of:
(a) injecting an ultrasonic signal through an aperture in a cylinder of an engine;
(b) cylinderically positioning the engine appropriately in accordance with the test to be performed; and
(c) detecting ultrasonic signals using a directional ultrasonic leak detector, thereby detecting sources of leakage from the engine.

* * * * *